(No Model.)
A. B. SIMONDS.
BICYCLE FRAME.
No. 602,369. Patented Apr. 12, 1898.
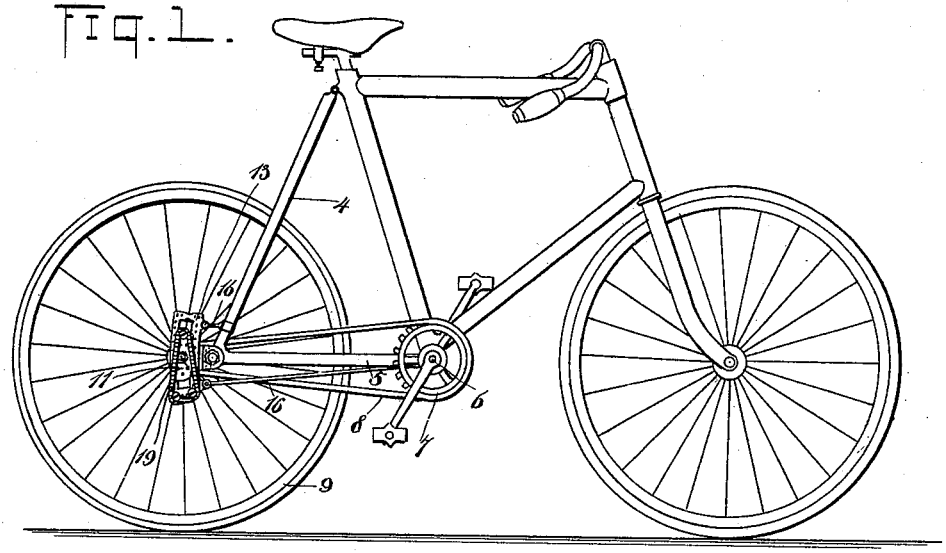
Fig. 1.
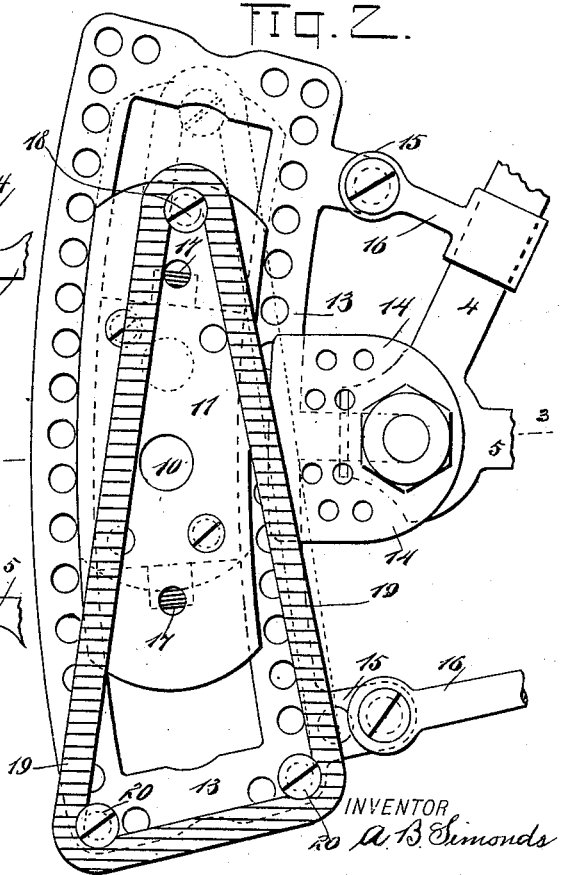
Fig. 2.
Fig. 3.
WITNESSES:
H. Hellyer.
Isaac B. Owens.
INVENTOR
A. B. Simonds
BY
ATTORNEYS.

UNITED STATES PATENT OFFICE.

AMOS B. SIMONDS, OF YOUNGSTOWN, OHIO.

BICYCLE-FRAME.

SPECIFICATION forming part of Letters Patent No. 602,369, dated April 12, 1898.

Application filed April 15, 1897. Serial No. 632,243. (No model.)

*To all whom it may concern:*

Be it known that I, AMOS B. SIMONDS, of Youngstown, in the county of Mahoning and State of Ohio, have invented a new and Improved Bicycle-Frame, of which the following is a full, clear, and exact description.

This invention is a bicycle-frame having peculiar means for establishing a spring connection between the frame and one of the axles, whereby the two may have a degree of independent movement, serving to relieve the rider of jars incident to the rolling of the machine over a rough path.

The invention is adapted to the rear wheel of the bicycle and is constructed so that the independent movement of said wheel will be in an arc struck from the crank-axle, whereby the movement referred to will not interfere with the operation of the chain-and-sprocket driving-gear.

The invention consists in the novel construction and combination of the several parts, as will be hereinafter fully set forth, and pointed out in the claim.

Reference is to be had to the accompanying drawings, forming a part of this specification, in which similar characters of reference indicate corresponding parts in all the figures.

Figure 1 is a side elevation of the invention in use. Fig. 2 is an enlarged side elevation of the invention, and Fig. 3 is a sectional view on the line 3 3 of Fig. 2.

The frame of the bicycle is provided with a rear fork 4 and two back stays 5. The crank-axle 6 carries a sprocket-wheel 7, over which the chain 8 runs. The chain 8 passes around the small sprocket-wheel $8^\times$ on the axle of the rear wheel 9. The ends of the axle of the rear wheel 9 are extended and respectively fitted within openings 10, formed, respectively, in the blocks 11. The blocks 11 are elongated vertically and have grooves 12 in their front and rear edges, respectively, receiving the vertical inner edges of the frames 13, which are elongated vertically and have their said inner edges curved in an arc concentric to the center of the axle 6. The side edges of the blocks 11 are also curved in the same arc, so that the blocks slide evenly through the space between the inner edges of the frames 13. The frames 13 are respectively attached to the back stays 5 and members of the rear fork 4 by lugs 14, carried on the frames 13. Each frame 13 is also provided with two lugs 15, projecting toward the axle 6. These lugs have braces 16 attached thereto. The braces 16 run forward and toward the axle 6 and are connected to the frame in any suitable manner, as indicated in Fig. 1. By these means the frames 13 are held rigidly on the main frame of the bicycle.

Each block 11 has at each end a recess respectively capable of receiving the end portions of the frames 13 as the blocks move to the limit of their vertical play. Within these recesses rubber cushions 17 are respectively mounted. The cushions 17 are adapted to engage with the corresponding portions of the frames 13, so as to relieve the parts of any strain incident to violent contact. Attached to the upper portion of each block 11 and at the outer side thereof is a stud 18. The studs 18 respectively carry very strong rubber bands 19, which respectively pass downward and around studs 20, that are located two at the lower outer side of each frame 13.

The bands 19 tend to lift the frames 13 up to the blocks 11. This lifts the bicycle-frame also. The weight of the rider counteracts the tension of the bands 19, and these opposing forces maintain a center in which the rear portion of the bicycle-frame is suspended. This center is disturbed whenever external influences are applied. For example, when the rear wheel of the bicycle strikes an obstruction the wheel moves quickly upward, carrying with it the blocks 11, but not disturbing the position of the bicycle-frame, excepting to raise it evenly and gently a very slight degree. As the obstruction is passed the parts again assume the normal position, which, for example, is that shown in Fig. 2. The formation of the frames 13, curved in the arc of which the crank 6 is the center, permits the wheel 9 to move freely without disturbing the operative arrangement of the driving-gear. The block 11 carries the axle of the wheel 9 and also swings the chain 8 and the sprocket-wheel $8^\times$ in an arc around the axle 6 and the sprocket 7.

Having thus described my invention, I claim as new and desire to secure by Letters Patent—

The combination with a bicycle-frame, of auxiliary frames each having a curved guideway, a forwardly-projecting lug on each auxiliary frame by which it is attached to the back stay and the rear fork of the frame, forwardly-projecting lugs located respectively above and below the first-mentioned lug, braces attached to said lugs and connected with the main frame of the bicycle, a block fitted to slide in the curved guideway of each auxiliary frame, each block being formed at its ends with recesses capable of receiving portions of the auxiliary frame as the block slides therein, cushions mounted within the said recesses and adapted to engage with the corresponding portions of the frame, a stud attached to the upper portion of each block at the outer side, studs located at the lower outer portion of each auxiliary frame, an elastic band passing around the said studs and a wheel having the ends of its axle fitted in openings formed in the said blocks, substantially as described.

AMOS B. SIMONDS.

Witnesses:
IDWAL HUGHES,
JOHN H. JENKINS.